(12) United States Patent
Carter et al.

(10) Patent No.: US 8,499,103 B2
(45) Date of Patent: Jul. 30, 2013

(54) CONVERTER DEVICE TO CONVERT BETWEEN DIFFERENT SMALL FORM FACTOR PLUGGABLE STANDARDS

(75) Inventors: Adam J. Carter, San Jose, CA (US); Karthik Ramaswamy, San Jose, CA (US); Marco Mazzini, Sesto San Giovanni (IT); Norman Tang, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 12/763,272

(22) Filed: Apr. 20, 2010

(65) Prior Publication Data

US 2011/0255574 A1 Oct. 20, 2011

(51) Int. Cl.
*G06F 3/00* (2006.01)
(52) U.S. Cl.
USPC ............ 710/11; 710/1; 710/5; 710/8; 710/14; 710/62
(58) Field of Classification Search
USPC ............... 710/1, 2, 5, 7, 8, 10, 20, 33, 11, 14, 710/62
See application file for complete search history.

(56) References Cited

U.S. PATENT DOCUMENTS

| | | | |
|---|---|---|---|
| 7,044,656 B1 * | 5/2006 | Hofmeister et al. | 385/89 |
| 7,226,217 B1 * | 6/2007 | Benton et al. | 385/89 |
| 7,335,033 B1 * | 2/2008 | Edwards et al. | 439/76.1 |
| 2005/0025307 A1 * | 2/2005 | Xu et al. | 379/398 |
| 2006/0008210 A1 * | 1/2006 | Cornell et al. | 385/48 |
| 2007/0237468 A1 * | 10/2007 | Aronson et al. | 385/100 |
| 2009/0016685 A1 * | 1/2009 | Hudgins et al. | 385/92 |
| 2009/0210637 A1 * | 8/2009 | Yung et al. | 711/154 |
| 2010/0061069 A1 * | 3/2010 | Cole | 361/761 |
| 2010/0178054 A1 * | 7/2010 | Cain | 398/58 |
| 2010/0296559 A1 | 11/2010 | Barbieri et al. | |
| 2011/0116751 A1 * | 5/2011 | Terlizzi et al. | 385/88 |
| 2011/0243567 A1 * | 10/2011 | Su et al. | 398/117 |

* cited by examiner

*Primary Examiner* — Idriss N Alrobaye
*Assistant Examiner* — Jasjit Vidwan
(74) *Attorney, Agent, or Firm* — Edell, Shapiro & Finnan, LLC

(57) ABSTRACT

A converter apparatus is provided enabling conversion of data between different form factor pluggable standards. The converter comprises a first connector that connects to a first device according to a first form factor pluggable standard, and a second connector that connects to a second device according to a second form factor pluggable standard. The converter further comprises a signal processor coupled between the first connector and the second connector. The processor converts at least one of transmit signals in the first form factor pluggable standard to transmit signals in the second form factor pluggable standard and receive signals in the second form factor pluggable standard to receive signals in the first form factor pluggable standard. A controller in the converter is coupled to the processor and to the first and second connector. The controller configures the processor to be used for converting signals between the form factor pluggable standards.

17 Claims, 6 Drawing Sheets

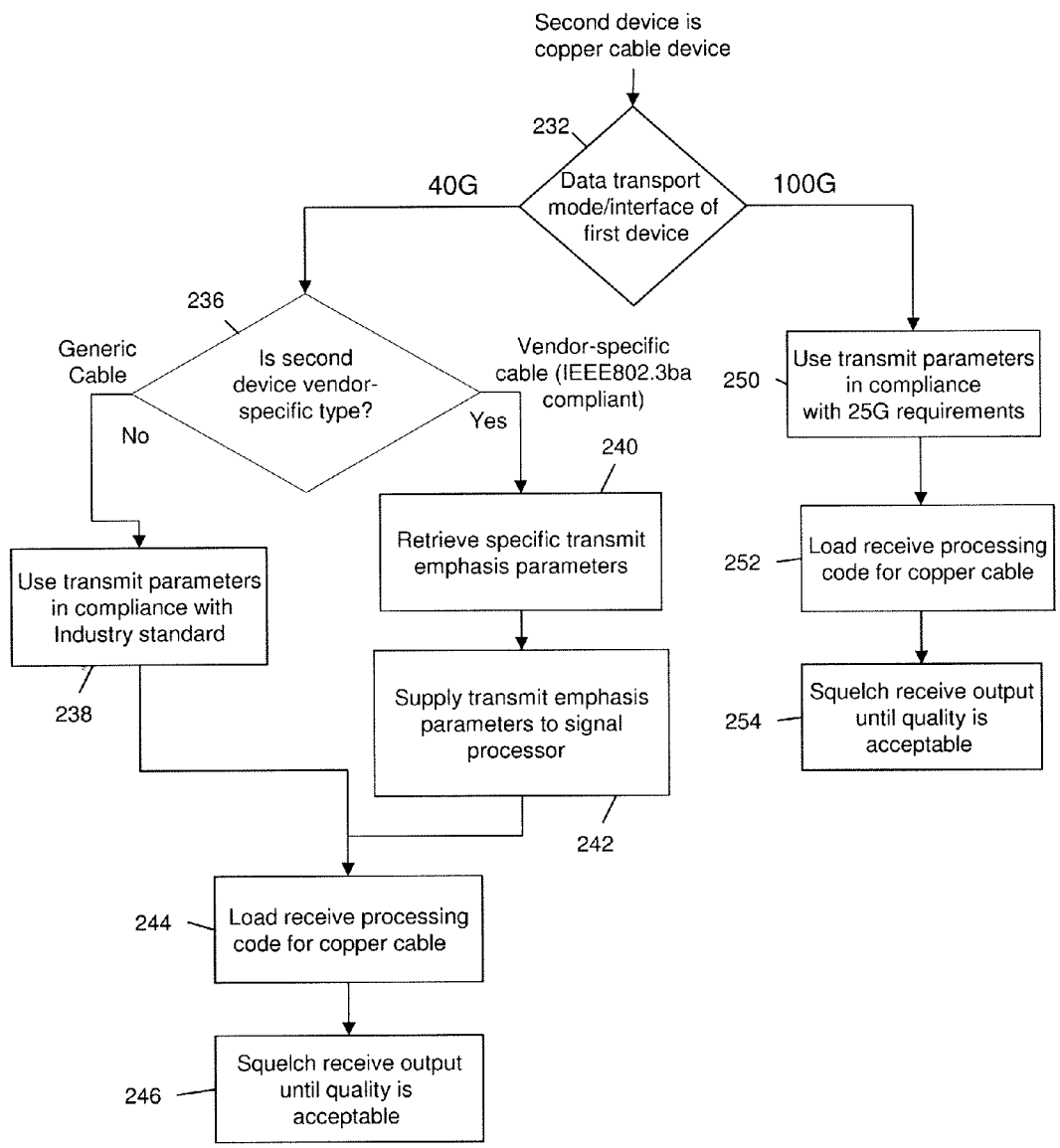

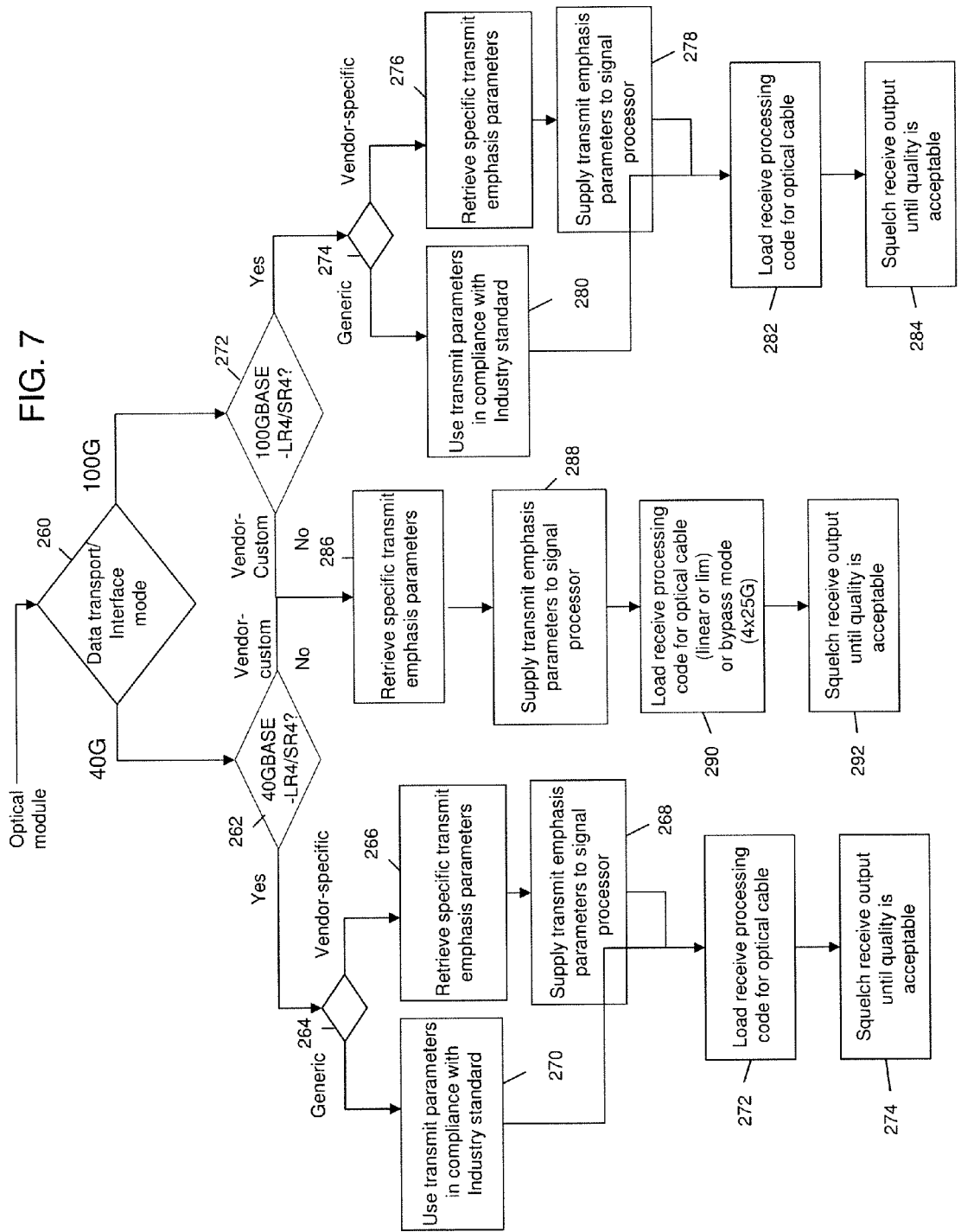

CONVERTER DEVICE TO CONVERT BETWEEN DIFFERENT SMALL FORM FACTOR PLUGGABLE STANDARDS

TECHNICAL FIELD

The present disclosure relates to networking equipment and more particularly to an apparatus that connects between devices of different form factor pluggable standards.

BACKGROUND

In the field of networked communication and network transport devices, industry standards are evolving to support ever increasing data transport rates. For example, the IEEE 802.3 family of data link layer standards specify requirements for equipment for Ethernet LAN and WAN applications, and will support speeds faster than 10 gigabits per second (G), and in particular 40 G and 100 G, over copper links and optical links. Moreover, the IEEE 802.3ba standard specifies 40/100 G interfaces based on parallel optics. Network equipment needs to interface and connect with each other to support these higher data transport rates.

Interface technologies known to accommodate connectivity of network equipment include, for example, the C-Form-Factor Pluggable (CFP) standard and the Quad Small Form-Factor Pluggable (QSFP) standard. The QSFP standard comprises a plurality of channels or lanes that are transported in parallel.

The ability for a device to convert signals from one small form factor standard to another form factor standard would allow for greater flexibility in network equipment deployments.

BRIEF DESCRIPTION OF THE DRAWINGS

FIGS. 5-7 are examples of more detailed flow charts depicting operations of the converter apparatus of FIG. 1.

DESCRIPTION OF EXAMPLE EMBODIMENTS

Overview

A converter apparatus is provided that enables conversion of data (traffic) between different form factor pluggable standards. The converter apparatus comprises a first connector configured to be coupled to a first device according to a first form factor pluggable standard, and a second connector configured to be coupled to a second device according to a second form factor pluggable standard. The converter apparatus further comprises a signal processor configured to be coupled between the first connector and the second connector. The signal processor is configured to convert at least one of transmit signals in the first form factor pluggable standard received at the first connector to transmit signals in the second form factor pluggable standard and receive signals in the second form factor pluggable standard received at the second connector to receive signals in the first form factor pluggable standard. A controller in the converter apparatus is configured to be coupled to the signal processor, to the first connector and to the second connector. The controller is configured to query the first device via the first connector to receive information indicating which of a plurality of data transport modes the first device is configured to support, and to query the second device via the second connector to receive information indicating whether the second device is an optical device or an electrical device. The controller configures the signal processor as to parameters used for converting signals between the first and second form factor pluggable standards.

Example Embodiments

Figure 1:
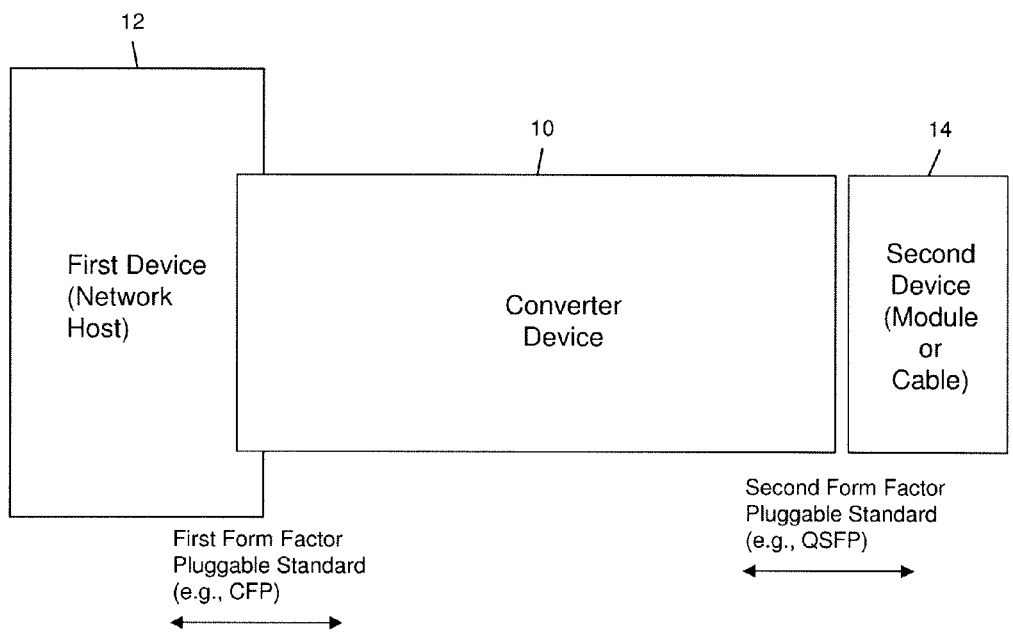
FIG. 1 is an example of a block diagram illustrating a converter apparatus.

Reference is first made to FIG. 1. FIG. 1 shows a converter device 10 that is configured to connect to a first device 12 and a second device 14. The first device 10 exchanges data according to a first form factor pluggable standard, e.g., the C-Form Factor Pluggable (CFP) standard and the second device 10 exchanges data according to a second form factor pluggable standard, e.g., the Quad Form Factor Pluggable (QSFP) standard. The first device 12 is, for example, a network switch, and is also referred to herein as a network host device or simply a host. The second device 14 is, for example, an electrical cable or optical cable or module. The converter device 10 is deployed in a networking infrastructure environment where the first device is, for example, an optical switch.

As will become apparent hereinafter, the converter device 10 is capable of interfacing signals between the first device 12 and second device 14 for multiple types of data transport modes and multiple devices of second devices, whether electrical or optical devices. The converter device 10 converts traffic data between the first form factor pluggable standard and the second form factor pluggable standard in a variety of data transport modes to enable connectivity between the first device and a plurality of different types of second devices.

Figure 2:
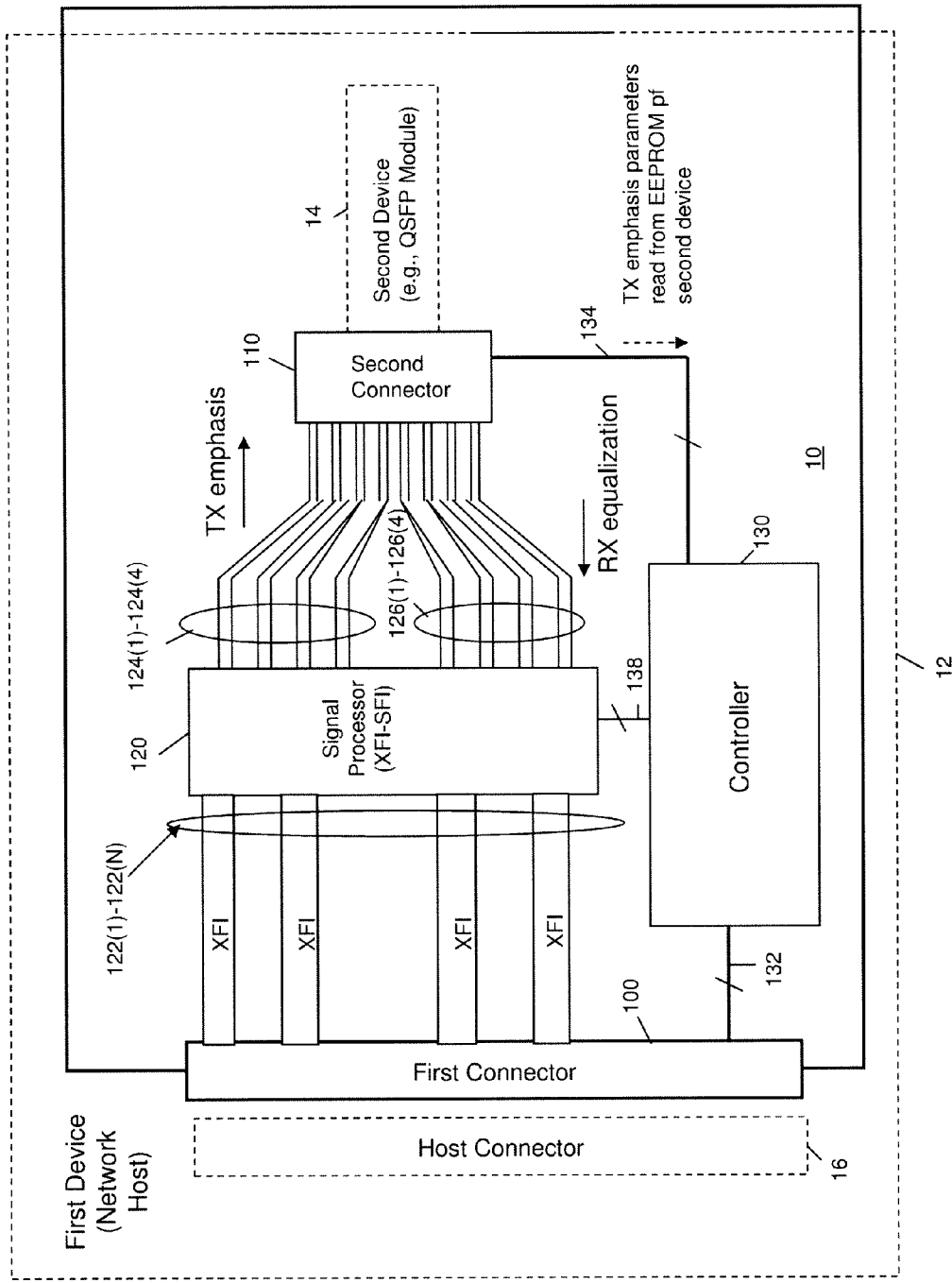
FIG. 2 is an example of a block diagram illustrating the converter apparatus of FIG. 1 in more detail.

Reference is now made to FIG. 2 that illustrates a more detailed block diagram of the converter device 10. The converter device 10 comprises a first connector 100 that is configured to connect with (or to be coupled to) a connector 16 within the first device 12, and a second connector 110 configured to connect to (or be coupled to) the second device 14. The first connector 100 is configured to connect to the first device 12 in accordance with the aforementioned first form factor pluggable standard, e.g., the CFP standard. The second connector 110 is configured to connect to the second device 14 in accordance with the aforementioned second form factor pluggable standard, e.g., QSFP.

A signal processor 120 is provided that is configured to be coupled between the first connector 100 and the second connector 110. The signal processor 120 is configured to convert transmit signals in the first form factor pluggable standard received at the first connector 12 to transmit signals in the second form factor pluggable standard and to convert receive signals in the second form factor pluggable standard received at the second connector 14 to receive signals in the first form factor pluggable standard. The signal processor 120 may be a collection of application specific integrated circuits, programmable digital signal processors, or other signal processing components that are configured to perform the converting techniques referred to herein, and to be configured to select from a variety of signal processing techniques for converting between different data standards. In this regard, the signal processor 120 is also referred to herein as a signal processing unit. The signal processor 120 also performs electronic dispersion compensation (EDC) with respect to optical signals to sharpen the "eye" pattern of modulated signals.

There are a plurality of transmit/receive signal paths or lanes 122(1)-122(N), according to a first signal type, called XFI lanes, between the first connector 100 and the signal processor 120. XFI is a 10 gigabit per second chip-to-chip electrical interface specification defined as part of the XFP multi-source agreement. Examples of XFI applications are 10 G Ethernet, 10 G Fibre Channel, SONET OC-192, SDH STM-64, 10 G OTN OTU-2, and parallel optics links. Each XFI lane 122(i) can carry 10 G data in either direction. In one example, there are 4 XFI lanes and in another example, there are 10 XFI lanes. Alternatively, each XFI lane may carry 25 G of data to accommodate future standards under consideration by the IEEE, for example, for any 100 GBASE application.

Likewise, there are a plurality of transmit signal paths 124(1)-124(4) according to a second type between the signal processor 120 and the second connector 110, and a plurality of receive signal paths 126(1)-126(4) according to the second type between the second connector 110 and the signal processor 120. For example, the signal paths 124(1)-124(4) and 126(1)-126(4) are Serializer-Deserializer (SerDes) Framer Interface (SFI) signal paths, and there are four paths in the transmit direction and four paths in the receive direction, for example, to accommodate the "quad" nature of the QSFP or QSFP pluggable standard.

A controller 130 is provided that is configured to be coupled to the signal processor 120, to the first connector 100 and to the second connector 110. The controller 130 is, for example, a microprocessor or microcontroller, or in another example, a programmable processing device, such as a field programmable gate array (FPGA) device. The controller 130 configures and controls operation of the signal processor 120 depending on the type of data transport modes supported by the first device 12 and the type (electrical or optical) of second device 14. As explained further hereinafter, the controller 130 is configured to query the first device 12 via the first connector 110 to receive a signal from the first device 12 (via the connector 100) indicating which of a plurality of data transport modes the first device 12 is configured to support and receiving data from the second device. The controller 130 also queries the second device 14 via the second connector 110 to receive a signal indicating whether the second device 14 is an optical device or an electrical device. The controller 130 configures the signal processor 120 as to parameters to be used for converting signals between the first and second form factor pluggable standards.

There is a bus connection 132 between the controller 130 and the first connector 100 to allow the controller 130 to query and read configuration parameters of the first device 12 (e.g., which data transport modes are supported by the first device, etc.). Similarly, there is a bus connection 134 between the controller 130 and the second connector 110 to allow the controller to query and read configuration parameters of the second device 14. For example, a management data input/output (MDIO) bus structure may be provided in the bus connections 132 and 134. MDIO is a bus structure defined for the Ethernet protocol, and is defined to connect Media Access Control (MAC) devices with PHY devices, providing a standardized access method to internal registers of PHY devices. In other words, using the MDIO in the bus connections 132 and 134, the controller 130 can send read commands to the first device and second device, respectively, to read the content of internal registers or Electrically Erasable Programmable Read-Only Memories (EEPROMs) in the first device and second device, respectively, so that the controller 130 can learn about the type and/or capabilities of these devices in order to properly configure operations of the signal processor 120.

The controller 130 is also coupled to the signal processor 120 by a connection path 138. The controller 130 uses the connection path 138 to supply controls and configurations to the signal processor 120 for use in converting signals between the different data formats and also to perform appropriate transmit emphasis, when converting transmit signals according to the first form factor pluggable standard received from the first device 12 at the first connector 100 to transmit signals according to the second form factor pluggable standard, and likewise when converting receive signals according to the second form factor pluggable standard received from the second device 14 to receive signals according to the first form factor pluggable standard.

Figure 3:
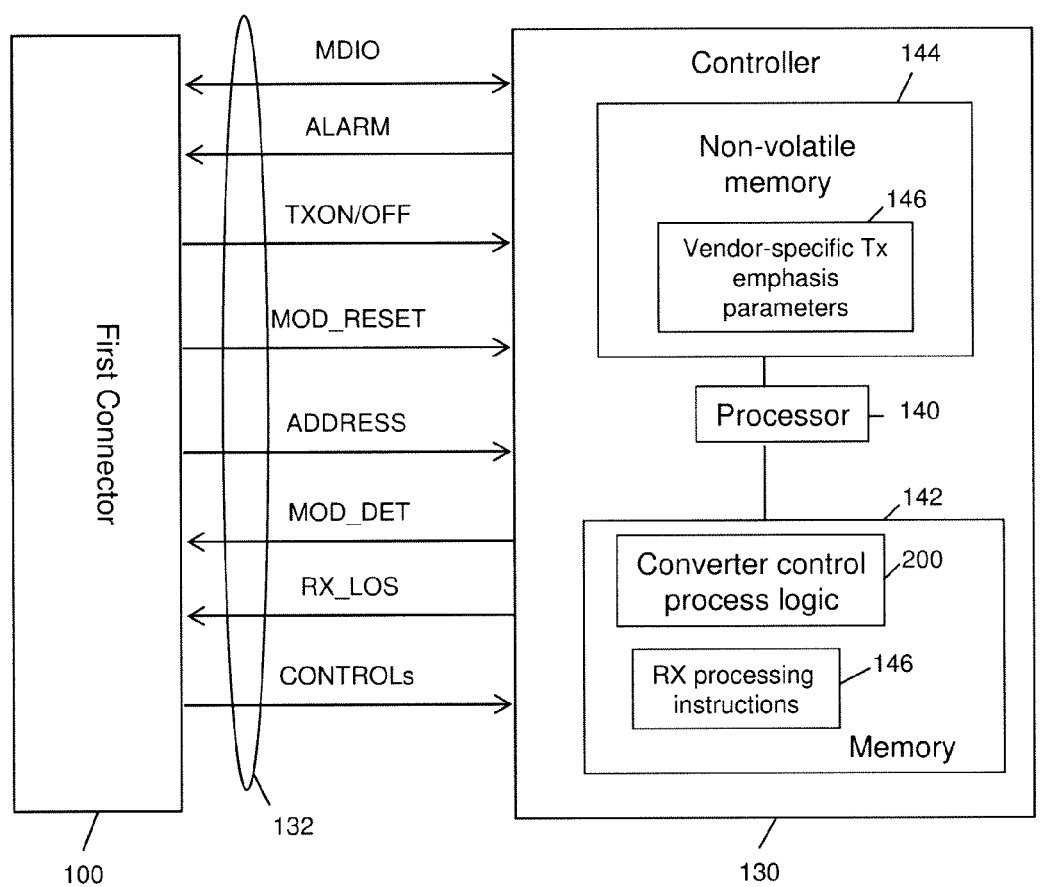
FIG. 3 is an example of a block diagram of a controller in the converter apparatus of FIG. 1.

Turning now to FIG. 3, an example of a block diagram of the controller 130 and its connectivity to the first connector 100 is now described. The controller 130 comprises, for example, a processor 140, a memory 142 and a non-volatile memory 144. The memory 142 is, for example, a random access memory, and is encoded with or otherwise stores instructions for converter control process logic 200. In addition, the memory 142 stores receive (Rx) processing instructions 146. The Rx processing instructions 146 comprises, for example, microcode for use by the signal processor 120, when converting receive signals in the second form factor pluggable standard to the first form factor pluggable standard for EDC processing of the receive signals. The memory 142 may store Rx processing instructions configured to multiple different types of second devices (electrical versus optical) and different data transport modes as well.

The non-volatile memory 144 is, for example, an EEPROM, and it stores vendor-specific transmit (Tx) emphasis parameters 148. The controller 130 reads the vendor-specific Tx emphasis parameters from the non-volatile memory 144 and supplies them to the signal processor 120 if the second device is determined to be manufactured according to a specific set of requirements. As an alternative, the Tx emphasis parameters can be also stored in an EEPROM of the second device 14. In this case, the controller 130 reads the Tx emphasis parameters stored in an EEPROM of the second device 14 through the MDIO, and the controller 130 can update parameters stored in memory 142 for the second device 14. In this way, the Tx parameters are instantaneously updated when a vendor-specific second device 14 is inserted or connected to the converter device 10. This is explained further hereinafter in connection with FIGS. 5-7.

FIG. 3 also illustrates the signals that are transmitted across the bus connection 132. The MDIO, as explained above, is a bus structure specified by IEEE 802.3. It is implemented by two pins, an MDIO pin and a management data clock (MDC) pin. The converter device 10 uses the MDIO interface for control and monitor functions, and as explained above, to obtain identifier information about the first device for purposes of determining its data transport mode capabilities. It is also used for monitoring optical parameters and for functional control.

ALARM refers to signaling from the controller 130 to the first device 12 for alarm, control and monitor functions that the controller 130 has with respect to the first device 12, an example of which is described hereinafter.

TXON/OFF is a signaling scheme for indicating state of the first device 12 in terms of readiness to receive signals from the second device 14. When TXON/OFF is asserted, the optical output of the second device (e.g., a QSFP module) inside the converter device 10 is turned off. When TXON/OFF is de-asserted, the transmitter in the second device 14 is turned on according to a predefined Tx turn-on process.

MOD_RESET is an active-low logic signal. When MOD_RESET is asserted, the converter device 10 enters a reset state, and conversely when it is de-asserted, the converter device 10 comes out of the reset.

ADDRESS represents the MDIO physical port addresses used to address all of the ports contained within the first device. The physical port address lines are driven by the first device 12 to set the converter device 10 and the second device 14 physical port addresses to match the address specified in the MDIO Frame.

MOD_DET is an output signal from the converter device 10 to the first device 12. MOD_DET asserts a "Low" condition when the converter device 10 is plugged into the host connector 16 and is asserted "High" when the converter device 10 is physically absent from a host connector 16.

RX_LOS is a receiver loss of signal indicator signal. When asserted, it indicates the received optical power in the second device (e.g., QSFP module) of the converter device 10 is lower than the expected optical power alarm threshold, which is application specific.

CONTROLs are control signals that allow the first device 12 to program certain controls via a hardware pin.

Figure 4:
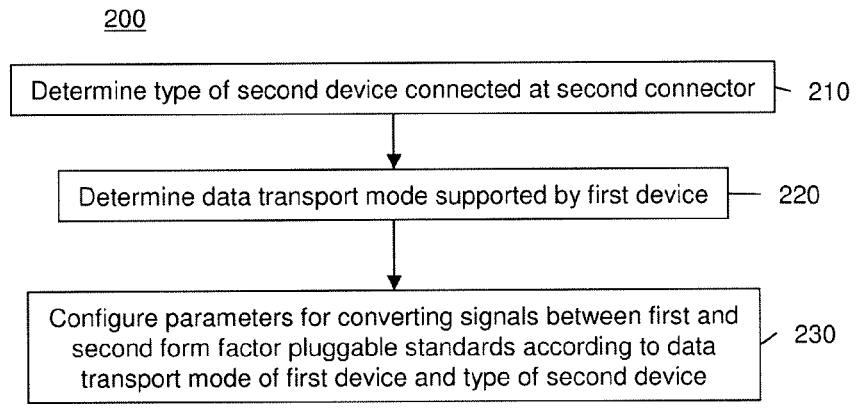
FIG. 4 is an example of a high level flow chart depicting operations of the converter apparatus of FIG. 1.

Turning now to FIG. 4, the converter control process logic 200 is now generally described. At 210, the controller 130 determines the type of second device 12 connected to the second connector. This operation is described in more detail hereinafter in connection with FIG. 5. Generally, operation 210 involves the controller 130 sending a query (a read command), via the MDIO bus, to the second device 14, via the second connector 110, to read field of an EEPROM or other register or storage element in the second device in order to obtain a signal or configuration information (identification code) indicating whether the second device 14 is an optical device or electrical device. The controller 130 uses the signal or configuration information that it reads from the second device to determine whether the second device is manufactured according to a specific set of requirements. This latter operation enables the controller 130 to configure the signal processor 120 with specific transmit signal processing parameters adapted for certain types of second devices for use when converting transmit signals from the first device 12 to transmit signals suitable for the second device 14. When making the determination at 210, the controller 130 may read an identification code stored in the EEPROM or other storage element of the second device 14 and compare the identification code against a stored set of identification codes to determine whether the second device 14 is an electrical device or optical device and also whether the second device 14 is a type of device that, based on its identification code, is manufactured according to a specific set of requirements.

At 220, the controller 130 determines the data transport modes supported by the first device. For example, the first device 12 (host) may support a first data transport mode, e.g., 40 G mode in which only 40 G traffic or 40/100 G traffic (through the XFI lanes) in accordance with the 40 GBASE functionality set is supported, or a second data transport mode, e.g., a 100 G mode in which the first device 12 (host) supports 100 G traffic or 40/100 G traffic (through the XFI lanes) in accordance with the 100 GBASE functionality set. The controller 130 determines the data transport modes supported by the first device 12 by reading information, via the MDIO bus, one or more configuration registers in the first device 12, where the configuration information retrieved from the first device reveals the data transport modes that the first device supports.

It should be understood that optical and electrical networking equipment are manufactured to enable a device, such as the converter device 10, to read configurations parameters associated with the device. The MDIO bus is one example of such a capability, but there are other techniques, now known or hereinafter developed, that may be useful for the converter device 10 to determine the configuration parameters of the first device 12 and second device 14.

Next, at 230, the controller configures parameters for converting signals between first and second form factor pluggable standards according to the data transport mode of the first device and the type determined for the second device. The operations at 230 are described in more detail in connection with FIGS. 6 and 7.

Figure 5:
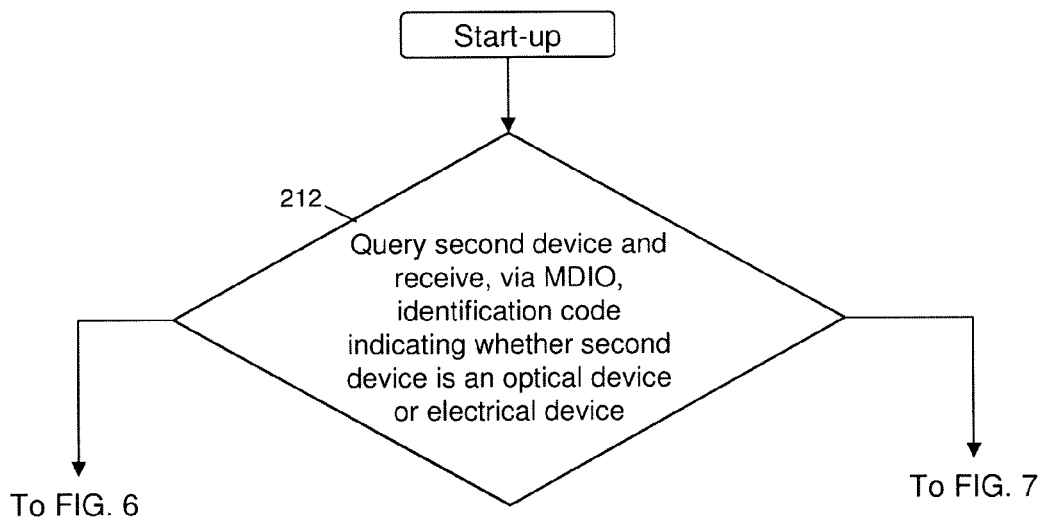

Reference is now made to FIG. 5 for an example of the operation 210, which in this example, the operation is labeled with reference numeral 212. The operation 212 involves the controller 130 querying, via the MDIO bus, configuration data (e.g., device identification code, etc.) stored in a register (e.g., EEPROM) of the second device. The device identification codes are categorized (numerically) to allow the controller 130, based on a priori knowledge of the categorization of identification codes stored, to determine whether the second device is an electrical device or an optical device based on the identification code read from the second device 14. Also, at this time, based on the identification code (or other information stored in the second device 14 that the controller 130 reads), the controller 130 determines whether the second device 14 is a type of device that is a vendor-specific device, meaning that it is a particular type of device that was manufactured according to a specific set of requirements.

When the controller 130 determines that the second device 14 is an electrical device, the controller 130 performs operations depicted by the flow chart shown in FIG. 6. Conversely, when the controller 130 determines that the second device 14 is an optical device, the controller 130 performs operations depicted by the flow chart in FIG. 7.

Turning now to FIG. 6, a flow chart is described for operations performed when the controller 130 determines that the second device 14 is an electrical device, such as a copper cable. At 232, the controller decides which of two possible paths are taken depending on the data transport modes supported by the first device 12. For example, when the first device supports a first data transport mode, e.g., a 40 G mode (40 G traffic or 40/100 G traffic with a 40 GBASE functionality set), the operations of the path to the left side of FIG. 6 are executed. On the other when the first device 12 is determined to support a second data transport mode, e.g., a 100 G mode (100 G traffic or 40/100 G traffic with a 100 GBASE functionality set) the operations shown on the right side of FIG. 6 are executed.

The operations on the left side of FIG. 6 are first described, for the situation when the first device 12 supports a first data transport (interface) mode, e.g., 40 GBASE. At 236, the controller 130 determines whether the second device is a vendor-specific type of device. The controller can make this determination based on the identification code the controller 130 reads from the second device 14, as explained above.

A vendor-specific type for the second device is now explained. Cable and other networking equipment are manufactured to comply with any of a variety of industry standards, such as IEEE 802.3ba, in order to ensure interoperability with equipment made by numerous manufactures according to the same industry standard. However, a vendor may choose to make further design enhancements to a device to improve the performance of the device with other equipment, and perhaps with other equipment from that same vendor. The device will still be manufactured to comply with the industry standard, but certain features of the device can be exploited to achieve better performance than could be achieved with other devices. For example, "Brand-X" cable devices may have been manufactured according to a set or requirements (above and beyond the requirements of the industry standard) that can be exploited when they are used with other Band-X equipment. Thus, the converter device 10 is configured to recognize when the second device is a vendor-specific type of device and thus triggers the use of special signal processing, in the signal processor 120, to exploit the fact that the device has been designed and/or manufactured with a certain set of requirements or features.

When at 236, the controller 130 determines that the second device 14 is not a vendor-specific type of device, e.g., it is a IEEE 802.3ba generic device, then at 238, the controller 130 configures the signal processor 130 to use transmit signal processing parameters according to the normal/basic requirements of the applicable industry standard, e.g., IEEE 802.3ba, Clause 85. Thus, a default set of transmit signal processing parameters is used when the second device is determined to be a generic device.

On the other hand, when the controller 130 determines that the second device 14 is a vendor-specific type of device (which is also compliant with an industry standard such as the IEEE 802.3ba standard), the controller 130 retrieves from non-volatile memory 144 (FIG. 3), specific transmit emphasis parameters, and at 242, supplies those Tx emphasis parameters to the signal processor 120. Alternatively, as explained above in connection with FIG. 3, the vendor-specific Tx emphasis parameters are read from a storage element, e.g., an EEPROM, in the second device 14 when the second device 14 is first connected to the converter device 10. In other words, the converter device 10 obtains additional information in fields of the non-volatile memory, stored for a particular type or class of devices, or obtained from the second device 14, to use the specific transmit parameters to achieve optimum transmit emphasis for improved or enhanced signal robustness for that type of second device. The transmit parameters may include compensation values adapted to a certain length of electrical conductor used in the second device 14. The signal processor 120 uses these compensation values to produce better waveforms that carry the traffic (transmit signals) to the second device 14.

Next, at 244, the controller 130 loads Rx signal processing instructions (shown at 146 in memory 140 in FIG. 3) into the signal processor 120, which receive signal processing code is determined by the controller 130, to be appropriate or adapted for the type (determined by the controller at 212) of the second device. For example, the second device 14 may be a passive or active copper cable, and the controller 130 would determine this and load the appropriate receive processing code into the signal processor 120.

At this point, the signal processor 120 can begin converting transmit signals (from the first device) from the first small form factor pluggable standard to the second form factor pluggable standard and can begin converting receive signals (from the second device) from the second form factor pluggable standard to the first form factor pluggable standard. At 246, the controller 130 may monitor converted receive signals of the signal processor 120 and squelch (prevent) the receive signals output to the first device until the quality of the receive signals has converged to an acceptable condition. Thereafter, the signal processor 120 continues to convert signals between the two small form factor pluggable standards.

When at 232, the controller 130 determines that the first device supports the second data transport mode (e.g., 100 GBASE), then at 250, the controller 130 configures the signal processor 130 to use transmit signal processing parameters according to a different set of requirements, for example, 25 G requirements (where 4 XFI lanes support 100 GBASE), which are still under definition by the IEEE. The transmit signal processing parameters can be different from the industry standard transmit parameters used at 238 for 10 G XFI lanes. For example, the 25 G transmit parameters may be more stringent, and in one form, may be a feature that a vendor of the converter device 10 (and other related equipment) may configure only after a customer has paid an additional fee to activate this feature, by way of a soft-key arrangement.

At 252, the controller 130 loads the Rx processing instructions that is appropriate for a copper cable (either passive or active) for 25 G, and at 254, the controller will squelch the receive signal output until its quality is acceptable.

At 246 and 254, the controller 130 may generate an alarm signal to the first device when the receive signal output does not converge to acceptable conditions (within a predetermined period of time).

Reference is now made to FIG. 7 for a description of the operations the controller 130 performs when the second device 14 is determined to be an optical device. At 260, the controller determines whether the first device 12 supports the first data transport mode (40 GBASE) or the second data transport mode (100 GBASE). When the controller 130 has determined that the first device supports the first data transport mode, then at 262, the controller 130 determines whether the second device is an optical device that is compliant with the 40 GBASE-LR4 (long reach-quad) or 40 GBASE-SR4 (short reach-quad) standards. When the controller 130 determines (through operations described above in connection with 212 in FIG. 5) that the second device is compliant with the 40 GBASE-LR4 or 40 GBASE-SR4 standards, then at 264, the controller determines whether the second device is a generic device compliant with the IEEE 802.3ba standard or is a vendor-specific device (also compliant with the IEEE 802.3ba standard).

When the controller determines that the second device is a vendor-specific device, then at 266 the controller 130 retrieves from non-volatile memory 144 (FIG. 3), specific transmit emphasis parameters, and at 242, supplies those transmit emphasis parameters to the signal processor 120. Alternatively, as explained above in connection with FIG. 3, the vendor-specific Tx emphasis parameters are read from an EEPROM in the second device 14 when the second device 14 is first connected to the converter device 10. For example, these transmit emphasis parameters may configure the operations of the signal processor 120 in converting the transmit signals from the first small form factor pluggable standard to the second small form factor pluggable standard to account for length of the optical cable, etc. Operations 272 and 274 are similar to operations 255 and 246 described above in connection with FIG. 6, except that the Rx processing instructions loaded in this situation is configured for standard optics according to a defined interface with a limiting amplifier at its output.

When the controller 130 determines that the second device is a generic device, then at 270, the controller configures the signal processor 130 to use transmit signal processing parameters according to the normal/basic (default) requirements of the applicable industry standard, e.g., IEEE 802.3ba, Clause 86 (nPPI). Operations 272 and 274 are then executed with respect to loading Rx processing instructions.

At 260, when the controller 130 determines that the first device supports the second data transport mode (100 GBASE), then at 272, the controller 130 determines whether the second device is an optical device that is compliant with the 100 GBASE-LR4 or 100 GBASE-SR4 standards. When the controller 130 determines (through operations described above in connection with 212 in FIG. 5) that the second device is compliant with the 100 GBASE-LR4 or 100 GBASE-SR4 standards, then at 274, the controller determines whether the second device is a generic device compliant with the IEEE 802.3ba standard or is a vendor-specific device (also compliant with the IEEE 802.3ba standard).

The operations for a vendor-specific second device are performed at 276 and 278 and are similar to operations 266 and 268, described above, except the transmit signal processing parameters are those configured for the 100 GBASE standards. Likewise, the operation 280 for a generic second device is similar to operation 250, described above in connection with FIG. 6, but for transmit processing of optical signal 25 G signals. Operations 282 and 284 are similar to operations 272 and 274 described above.

At operation 262 or operation 272, the controller 130 can determine that the second device is a vendor-custom device. A vendor-custom device is a non-standard part (vendor-custom). A non-standard or vendor-custom second device is a device that can cover different reaches, but is not otherwise compliant with the 40 GBASE-LR4 or 40 GBASE-SR4 standards, or with the 100 GBASE-LR4 or 100 GBASE-SR4 standards. In fact, these types of devices are under definition at the time of this writing.

Accordingly, at 286, the controller 130 retrieves specific transmit emphasis parameters stored in the converter device 10 for vendor-custom devices. At 288, the controller 130 supplies the transmit emphasis parameters to the signal processor 120. At 290, the controller loads the proper receive processing code into the signal processor 120 (for 40 G or 25 G), or configures a bypass mode in which case the receive signals from the second device bypass the signal processor 120. Operation 292 is similar to operation 274, described above.

In sum, FIGS. 5-7 represent a method for configuring a converter apparatus. The method comprises connecting a converter device to a first device configured to connect according to a first form factor pluggable standard; connecting the converter device to a second device configured to connect according to a second form factor pluggable standard; in the converter device, determining which of a plurality of data transport modes the first device is configured to support and determining whether the second device is an optical device or an electrical device; in the converter device, based on the determining, converting at least one of transmit signals in the first form factor pluggable standard received at the first connector to transmit signals in the second form factor pluggable standard and receive signals in the second form factor pluggable standard received at the second connector to receive signals in the first form factor pluggable standard.

Similarly, the flow of operations shown in FIGS. 5-7 for the converter control process logic 200 may be embodied as a processor readable medium (e.g., processor logic 200 encoded in memory 142) encoded with instructions that, when executed by a processor (e.g., processor 140), cause the processor to: in a converter device that is configured to be coupled to a first device according to a first form factor pluggable standard and to a second device according to a second form factor pluggable standard, determine which of a plurality of data transport modes the first device is configured to support; determine whether the second device is an optical device or an electrical device; based on the data transport modes the first device is determined to support and whether the second device is an electrical device or an optical device, configure a signal processing unit in the converter device, which signal processing unit converts at least one of the transmit signals in the first form factor pluggable standard received at the first connector to transmit signals in the second form factor pluggable standard and receive signals in the second form factor pluggable standard received at the second connector to receive signals in the first form factor pluggable standard.

Example Applications of the Converter Device 10

At the time of this writing, a "next generation" format for 40 GBASE interfaces is an interface denoted "QSFP+", where the "+" indicates that it is similar to QSFP, but with un-retimed optics. The converter device 10 may be configured to handle both QSFP and QSFP+ devices.

The converter device 10 may be embodied by active components on a printed circuit board (PCB). In one example, the converter device 10 receives incoming receive signals from the QSFP/QSFP+ second device 14 and the signal processor 120 re-times (for QSFP) or compensates and re-times (for QSFP+, limiting or linear case or copper) and sends the converted receive to the CFP first connector 100 that is coupled to the first device 110. The signal processor 120 may be embodied as a multiport (e.g., quad port or 10-port) EDC signal processor. For 100 GBASE, the signal processor 120 has 10 ports, but in general it may accommodate any suitable small form factor connector hereinafter developed.

The EDC operations of the signal processor 120 are configured to mitigate any impairment due to all components in the signal path, e.g., the second connector 110, e.g., QSFP connector, the signal processor 120, the signal paths in the converter device 10, etc. The signal processor 120 may be configured with EDC operations now known or hereinafter developed, to handle both the QSFP and QSFP+ standard.

In another example, the converter device 10 also allows for custom interfaces, such as 850 nm extended range (XR) that is useful for data center application, as well as distance extension applications beyond 100 m Optical Multimode 3 (OM3). In still another example, the converter device 10 can be configured to allow a linear QSFP+ 40 GBASE-SR device to be driven even beyond 100 OM3.

In one example, the signal paths or lanes 122(1)-122(N) are configured to comply with the Extended Limited AUTODIN Upgrade (XLAUI) high-speed electrical interface specification based on 4×10 G, such that there are four signal paths, each supporting 10 G. In another example, the signal paths or lanes 122(1)-122(N) are configured to comply with the CAUI 10×10 G electrical interface standard for supporting 100 GBASE-CR10 and 100 GBASE-SR10, such that there are 10 signals paths, each supporting 10 G, where the second device is CXP small form factor pluggable device, or any future suitable small form factor connector. As explained above in connection with FIGS. 6 and 7, the signal processor 120 is configured to compensate and potentially extend the XLAUI/CAUI channel budget with the proper (and adjustable) transmit emphasis parameter used to convert the transmit signals received from the first device (on the XLAUI/CAUI side) of the converter 10.

The converter device 10 can be configured also as a multiport converter having, for example, three QSFP-ports, with a dedicated physical layer host and associated logic and pin definitions, to a first device configured to interface according to the CFP standard.

The signal processor 120 also performs any required SerDes operations as well as priority memory access (PMA) loop-back functionality, to the first device 12 and to the second device 14. The SerDes operations of the signal processor

120 can be configured to support the EDC functionality for custom linear/limiting un-retimed interfaces that are hereinafter developed.

At the time of this writing, IEEE is also working to define an electrical 25 G channel with the goal of allowing system manufacturers to put 10:4 SerDes functions directly on a host device (e.g., a first device), thus reducing the size and costs for 100 GBASE-LR4 and extended reach 4 (ER4).

On the other hand, the network equipment industry is already developing 100BASE-CR4 cables in the CXP form factor. For example, 850 nm vertical cavity surface emitting lasers (VCSELs) are improving their high-rate performance, such that a 100 GBASE-SR4 interface is quite feasible in the future at the time of this writing. It is likely in the near future that a 100 GBASE interface will be able to fit into the same small form factor.

For a data center application, 100 GBASE-CR4 and SR4 is feasible also in the same QSFP form factor as for the 40 GBASE interfaces. Therefore, in one example, the converter device 10 is configured to leverage a first device operating in 25 G data transport mode that will be able to switch from 25 to 10 G operation depending on the type of interface, allowing the converter device 10 to have full interoperability between CFP-based first devices (hosts) and QSFP-based second devices.

Below is a table that illustrates examples of possible modes of operations for the converter device 10.

| Form Factor | Interface type (*denotes standard) | First Device (Host) Mode |
|---|---|---|
| QSFP or similar | 40GBASE-CR4 | 10 G Mode/EDC |
| QSFP or similar | 40GBASE-SR4 | 10 G Mode/Lim |
| QSFP or similar | 40GBASE-LR4 | 10 G Mode/Lim |
| QSFP or similar | Any custom | 10 G Mode/EDC |
| QSFP or similar | 100GBASE-LR4 | 25 G Mode |
| QSFP or similar | 100GBASE-ER4 | 25 G Mode |
| QSFP or similar | Non-standard 100GBASE-CR4 | 25 G Mode |
| QSFP or similar | Non-standard 100GBASE-SR4 | 25 G Mode |
| QSFP or similar | Any custom | 25 G Mode |

The converter device 10 allows an equipment vendor to save costs by developing a reduced number of different interface devices than would otherwise be needed for CFP and QSFP. The current 40 GBASE-CR4 cable format (QSFP) can be used for the CFP-based platform, ensuring interoperability for the current 40 GBASE-SR4 or optical active cables format (QSFP/QSFP+) on the CFP-based platform. The converter device 10 is configured to be ready to serve the QSFP+ format (un-retimed QSFP) and for use with CFP-based host devices without requiring hardware changes. As explained herein, the converter device 10 can be designed for CFP to CXP (or any other suitable form factor) conversion for 100 GBASE parallel interfaces. Further still, as explained herein, the converter device 100 is configured to support potential custom optical electrical interfaces, whether re-timed or un-retimed, linear or limiting.

The above description is by way of example only.

What is claimed is:

1. An apparatus comprising:
   a first connector configured to be coupled to a first device according to a first form factor pluggable standard;
   a second connector configured to be coupled to a second device according to a second form factor pluggable standard;
   a signal processor configured to be coupled between the first connector and the second connector, wherein the signal processor is configured to convert at least one of transmit signals in the first form factor pluggable standard received at the first connector to transmit signals in the second form factor pluggable standard and receive signals in the second form factor pluggable standard received at the second connector to receive signals in the first form factor pluggable standard;
   a controller configured to be coupled to the signal processor, to the first connector and to the second connector, wherein the controller is configured to query the first device via the first connector to receive information indicating which of a plurality of data transport modes the first device is configured to support, and to query the second device via the second connector to receive information indicating whether the second device is an optical device or an electrical device, and wherein the controller configures the signal processor as to parameters used for converting signals between the first and second form factor pluggable standards; and
   a memory configured to store transmit signal processing parameters for second devices that are non-standard such that they do not comply with a data transport interface standard;
   wherein the controller is further configured to determine, based on the configuration information received in response to the query of the second device, whether the second device is non-standard and to retrieve from the memory the transmit signal processing parameters for non-standard second devices for use by the signal processor when converting transmit signals in the first form factor pluggable standard to transmit signals in the second form factor pluggable standard.

2. The apparatus of claim 1, wherein the memory is further configured to store transmit signal processing parameters for a particular type of the second device that is manufactured according to a specific set of specifications, which specific transmit signal processing parameters are adapted for optimum performance for the particular type of the second device, wherein the controller is further configured to query the second device to receive configuration information indicating whether the second device is a particular type of device manufactured according to the specific set of requirements and also in compliance with an industry standard.

3. The apparatus of claim 2, wherein the controller is configured to supply the specific transmit signal processing parameters to the signal processor when it determines that the second device is a manufactured according the specific set of requirements, and wherein the signal processor converts the transmit signals in the first form factor pluggable standard to the second form factor pluggable standard using the specific transmit signal processing parameters.

4. The apparatus of claim 1, wherein the controller is configured to read a storage element of the second device when the second device is connected at the second connector to obtain specific transmit signal processing parameters for a particular type of the second device that is manufactured according to a specific set of specifications, wherein the controller is configured to supply the specific transmit signal processing parameters to the signal processor, and wherein the signal processor converts the transmit signals in the first form factor pluggable standard to the second form factor pluggable standard using the specific transmit signal processing parameters.

5. The apparatus of claim 1, wherein the controller is configured to supply receive signal processing instructions to the signal processor to enable the signal processor to convert receive signals received at the second connector from the second device in the second form factor pluggable standard to receive signals in accordance with the first form factor pluggable standard based on whether the second device is determined to be an optical device or an electrical device.

6. The apparatus of claim 1, and further comprising a plurality of transmit/receive signal paths according to a first type between the signal processor and the first connector, and a plurality of transmit signal paths according to a second type between the signal processor and the second connector and a plurality of receive signal paths according to the second type between the second connector and the signal processor, and wherein the signal processor converts at least one of transmit signals received from the first connector which are formatted according to the first type to transmit signals formatted according to the second type and receive signals received from the second connector which are formatted according to the second type to receive signals formatted according to the first type.

7. The apparatus of claim 1, wherein the first connector is a connector compliant with the C-Form-Factor Pluggable standard and the second connector is a connector compliant with the Quad Form Factor Pluggable standard.

8. The apparatus of claim 1, and further comprising a first bus connection between the controller and the first connector and a second bus connection between the controller and the second connector, wherein first bus connection is configured to enable the controller to send to the first device the query comprising a read command to the first device to read configuration information stored in the first device, and wherein the second bus connection is configured to enable the controller to send to the second device the query comprising a read command to the second device to read the identification code stored in the second device, and wherein the signal received by the controller from the second device in response to the query to the second device comprises the identification code.

9. A method comprising:
  connecting a converter device to a first device configured to connect according to a first form factor pluggable standard;
  connecting the converter device to a second device configured to connect according to a second form factor pluggable standard;
  in the converter device, determining which of a plurality of data transport modes the first device is configured to support and determining whether the second device is an optical device or an electrical device;
  in the converter device, based on the determining, converting at least one of transmit signals in the first form factor pluggable standard received at the first connector to transmit signals in the second form factor pluggable standard and receive signals in the second form factor pluggable standard received at the second connector to receive signals in the first form factor pluggable standard; and
  storing transmit signal processing parameters for second devices that are non-standard such that they do not comply with a data transport interface standard;
  wherein determining comprises determining when the second device is non-standard and in response to retrieving the stored transmit signal processing parameters for non-standard second devices for use when converting transmit signals in the first form factor pluggable standard to transmit signals in the second form factor pluggable standard.

10. The method of claim 9, wherein storing comprises storing transmit signal processing parameters for a particular type of the second device that is manufactured according to a specific set of specifications, which specific transmit signal processing parameters are adapted for optimum performance for the particular type of the second device, and wherein determining further comprises determining whether the second device is manufactured according to the specific set of requirements and also in compliance with an industry standard.

11. The method of claim 10, wherein upon determining that the second device is manufactured according to the specific set of specifications, further comprising retrieving the stored specific transmit signal processing parameters for use in converting the transmit signals in the first form factor pluggable standard received at the first connector to transmit signals in the second form factor pluggable standard.

12. The method of claim 9, and further comprising storing receive signal processing instructions useful when the second device is an optical device and when the second device is an electrical device, and further comprising retrieving stored receive signal processing instructions based on the whether the second device is determined to be an optical device or electrical device, the retrieved receive signal processing instructions being used in converting the receive signals in the second form factor pluggable standard to receive signals in accordance with the first form factor pluggable standard.

13. The method of claim 9, and further comprising reading a storage element of the second device when the second device is coupled to the converter device to obtain specific transmit signal processing parameters for a particular type of the second device that is manufactured according to a specific set of specifications, the specific transmit signal processing parameters read from the second device being used in converting the transmit signals in the first form factor pluggable standard to the second form factor pluggable standard.

14. A processor readable medium encoded with instructions that, when executed by a processor, cause the processor to:
  in a converter device that is configured to be coupled to a first device according to a first form factor pluggable standard and to a second device according to a second form factor pluggable standard, determine which of a plurality of data transport modes the first device is configured to support;
  determine whether the second device is an optical device or an electrical device;
  based on the data transport modes the first device is determined to support and whether the second device is the electrical device or the optical device, configure a signal processing unit in the converter device, which signal processing unit converts at least one of the transmit signals in the first form factor pluggable standard received at the first connector to transmit signals in the second form factor pluggable standard and receive signals in the second form factor pluggable standard received at the second connector to receive signals in the first form factor pluggable standard;
  determine whether the second device is a non-standard device such that it does not comply with a data transport interface standard; and
  retrieve stored transmit signal processing parameters for non-standard devices to load the transmit signal processing parameters for non-standard devices into the signal processing unit.

15. The processor readable medium of claim 14, wherein the instructions that cause the processor to determine further comprise instructions that cause the processor to determine whether the second device is a particular type of device manufactured according to a specific set of requirements.

16. The processor readable medium of claim 15, wherein the instructions that cause the processor to configure comprise instructions that cause the processor to retrieve stored specific transmit signal processor parameters for the particular type of device manufactured according to the specific set of requirements, and to load the specific transmit signal processing parameters to the signal processing unit.

17. The processor readable medium of claim 15, wherein the instructions that cause the processor to configure further comprise instructions that cause the processor to load into the signal processing unit receive signal processing instructions to enable the signal processing unit to convert receive signals received at the second connector from the second device in the second form factor pluggable standard to receive signals in accordance with the first form factor pluggable standard based on whether the second device is determined to be an optical device or an electrical device.

* * * * *